United States Patent
Hoyer et al.

(10) Patent No.: US 10,723,146 B2
(45) Date of Patent: Jul. 28, 2020

(54) PRINTING SYSTEM REDUCED THROUGHPUT MODE

(71) Applicant: Hewlett-Packard Development Company, L.P., Spring, TX (US)

(72) Inventors: Brooke Hoyer, Vancouver, WA (US); Kenneth Blaine Wade, Vancouver, WA (US); Daniel James Magnusson, Vancouver, WA (US); Robert Yraceburu, Vancouver, WA (US); Benjamin Whitney Griffith, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/332,056

(22) PCT Filed: Sep. 12, 2016

(86) PCT No.: PCT/US2016/051377
§ 371 (c)(1),
(2) Date: Mar. 11, 2019

(87) PCT Pub. No.: WO2018/048454
PCT Pub. Date: Mar. 15, 2018

(65) Prior Publication Data
US 2019/0366735 A1  Dec. 5, 2019

(51) Int. Cl.
*B41J 11/00* (2006.01)
*B41J 2/045* (2006.01)
*B41J 29/393* (2006.01)
*G06K 15/02* (2006.01)
*G06K 15/00* (2006.01)

(52) U.S. Cl.
CPC ......... *B41J 11/002* (2013.01); *B41J 2/04508* (2013.01); *B41J 29/393* (2013.01); *G06K 15/1894* (2013.01); *G06K 15/407* (2013.01); *G06K 15/408* (2013.01)

(58) Field of Classification Search
CPC .................................................... B41J 11/002
See application file for complete search history.

(56) References Cited

U.S. PATENT DOCUMENTS 6,145,959 A * 11/2000 Lund ................... B41J 2/04515
347/14
6,229,721 B1 * 5/2001 Mano ..................... H02H 7/003
363/56.1

(Continued)

FOREIGN PATENT DOCUMENTS

WO   WO-2004050369 A1   6/2004

OTHER PUBLICATIONS

Mott ~ "How to Bypass an HP Photosmart Printer Cartridge Error", http://techin.oureverydaylife.com/ ~ 2010 ~ 3 pages.

*Primary Examiner* — Nicholas Pachol
(74) *Attorney, Agent, or Firm* — Mannava & Kang

(57) ABSTRACT

According to an example, a printing system may include printing components, an input voltage engine to determine whether an input voltage level is outside of a predetermined voltage level range, and a printing components engine to control the printing components to operate in one of a normal mode and a reduced throughput mode based upon whether the accessed input voltage level is outside of the predetermined voltage level range.

15 Claims, 3 Drawing Sheets

(56) References Cited

U.S. PATENT DOCUMENTS

| | | | |
|---|---|---|---|
| 6,591,073 B1* | 7/2003 | Fujii | B41J 29/393 399/88 |
| 8,976,410 B2 | 3/2015 | Cantero Lazaro et al. | |
| 9,098,031 B2 | 8/2015 | Cao et al. | |
| 2002/0102121 A1* | 8/2002 | Shaw | B41J 11/002 400/582 |
| 2007/0002985 A1 | 1/2007 | Sampath et al. | |
| 2007/0071475 A1* | 3/2007 | Blair | G03G 15/2046 399/68 |
| 2007/0189797 A1* | 8/2007 | Smith | B41J 2/0457 399/88 |
| 2008/0143809 A1* | 6/2008 | Tanaka | B41J 2/04515 347/194 |
| 2012/0287196 A1 | 11/2012 | Boland et al. | |
| 2013/0077126 A1* | 3/2013 | Gobeyn | G06K 15/002 358/1.15 |
| 2013/0078022 A1* | 3/2013 | Manico | B41J 3/54 400/76 |

* cited by examiner

PRINTING SYSTEM REDUCED THROUGHPUT MODE

BACKGROUND

In many printing systems, printing components, such as printheads are used to apply marking material (e.g., fluid or ink) onto a print media. The print media is typically driven past the printheads and through a dryer. The dryer heats the print media and dries the marking material onto the print media. The print media often moves quickly across the printing system in order to enable fast printing speeds. If the dryer is unable to adequately dry the marking material, the marking material may remain in liquid form and may thus be prone to smearing or other defects. However, if the dryer applies too much heat, over-drying may occur and the print media may become brittle or warped. In addition, application of too much heat wastes energy as the dryer consumes more energy than is required to properly dry the marking material onto the print media.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Additionally, It should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures.

Disclosed herein are printing systems and methods for operating printing components of printing systems. The printing systems and methods disclosed herein may enable the printing components to continue to print under a reduced throughput mode following a determination that a component of a dryer has failed or is otherwise functioning improperly. The printing systems and methods disclosed herein may also, or as another example, track input voltage levels supplied into a printing system and may cause the printing components to print under the reduced throughput mode following a determination that the input voltage level is outside of a predetermined voltage level range. Under the reduced throughput mode, the printing components may print at a reduced rate and/or may insert pauses between printing onto media sheets.

Through implementation of the apparatuses and methods disclosed herein, printing systems may continue to generate printed media even through conditions for generating the printed media may be less than nominal.

Figure 1A:
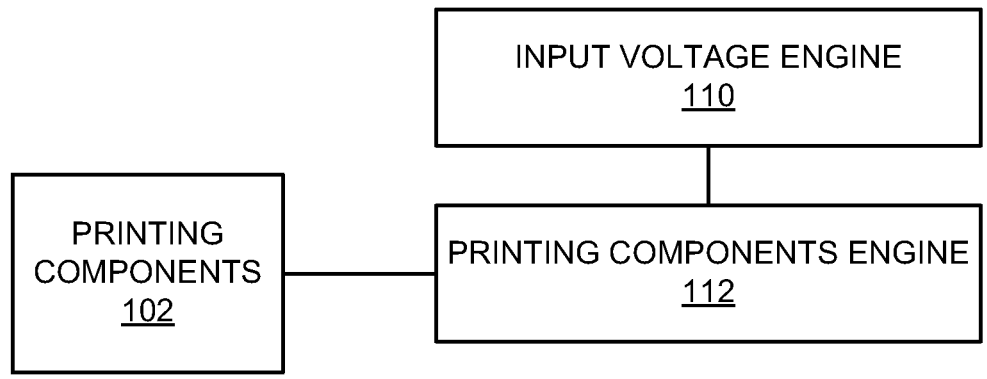
FIGS. 1A and 1B, respectively, depict block diagrams of example printing systems.
Figure 1B:
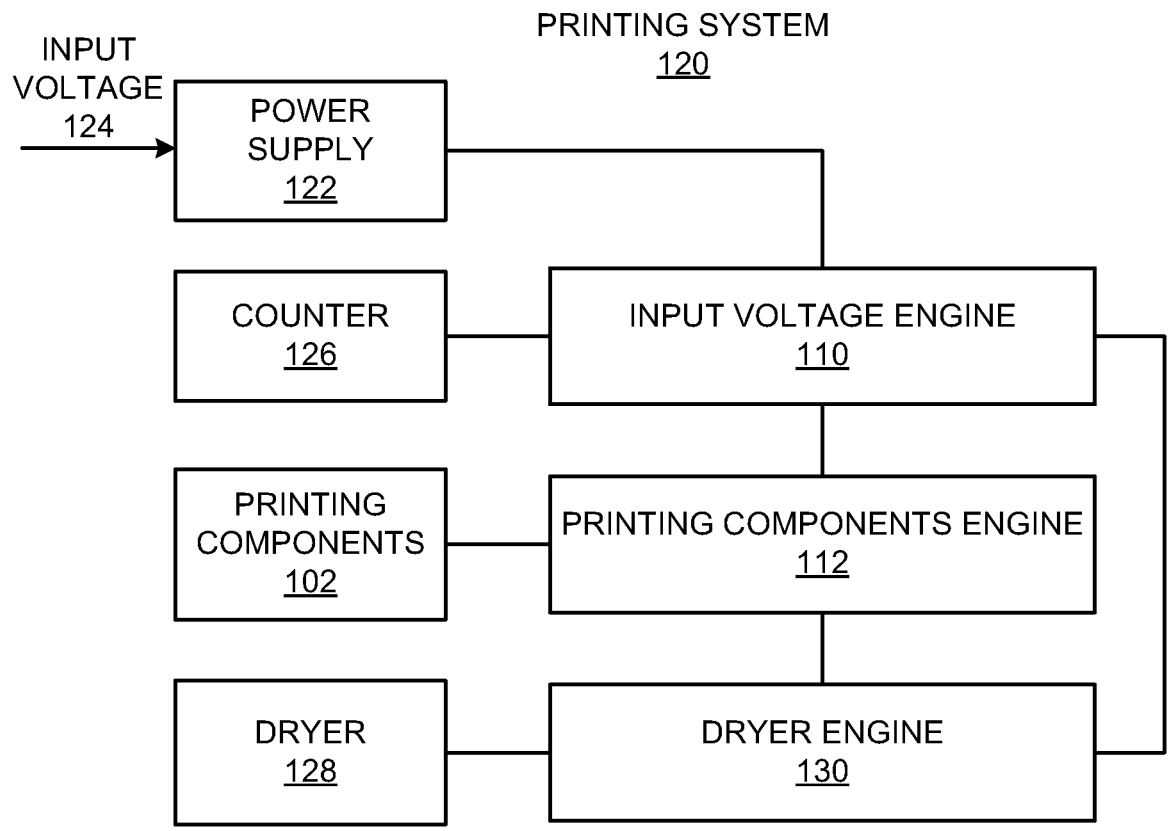

FIGS. 1A and 1B are block diagrams depicting respective example printing systems 100 and 120. It should be understood that the printing systems 100 and 120 depicted in FIGS. 1A and 1B may include additional components and that some of the components described herein may be removed and/or modified without departing from a scope of the printing systems 100 and 120 disclosed herein.

Referring first to FIG. 1A, the example printing system 100 may include printing components 102, an input voltage engine 110, and a printing components engine 112. The printing components 102 may represent mechanical parts of the printing system 100, electrical parts of the printing system 100, or combinations thereof. The printing system 100 may be an inkjet printing system, a laser printing system, a 3D printing system, or the like. An example inkjet printing system may include components such as a fluid ejection assembly (e.g., a printhead assembly), a fluid supply assembly, a carriage assembly, a print media transport assembly, a service station assembly, and an electronic controller to facilitate control of the any number of components. The printing components 102 may also include a print bar, a paper guide, a separator pad, a pinch roller, an alignment roller, a starwheel, a drum, a clamp, a servo, a pick tire, a fan, a tray, a bail, a power control unit, alignment devices, a stapler device, a hole punch device, a saddle stitching device, and the like. Example laser (e.g. toner) printing systems and/or example 3D printing systems may contain similar components, related components, or different components that may be adjustable (e.g., able to change to different operational states, such as two or more operational states).

Generally speaking, the printing components engine 112 may control the printing components 102 to operate in one of a normal mode and a reduced throughput mode based upon various factors including, for instance, determinations made by the input voltage engine 110. As particular non-limiting examples, under the normal mode, the printing components engine 112 may control the printing components 102 to print at a rate of about 19 inches per second (ips) under low density printing and at a rate of about 10 ips under medium-high density printing. In contrast, under the reduced throughput mode, the printing components engine 112 may control the printing components 102 to print at a rate of about 7 ips under low density printing and at a rate of about 2 ips under medium-high density printing. In addition or as another example, under the normal mode, the printing components engine 112 may control the printing components 102 to print consecutive sheets of media continuously. However, under the reduced throughput mode, the printing components engine 112 may control the printing components 102 to insert a pause between consecutive sheets of printed media. Under the reduced throughput mode, therefore, the printing components 102 may continue to print but at a slower rate than under the normal mode.

Examples of the media may include any type of suitable sheet material, such as paper, card stock, transparencies, fabric, packaging material, and the like. Examples of marking material may include ink, toner, or other type of marking material having one or multiple colors. The print data may include information pertaining to a rasterized version of the image and may identify locations, e.g., pixels, at which marking material having different colors is to be applied as well as the densities at which the marking material(s) are to be deposited.

The input voltage engine 110 and the printing components engine 112 may be processing components of the printing system 100 and may be provided on a circuit board, a motherboard, a main printed circuit assembly (MPCA), or the like, of the printing system 100. The input voltage engine 110 may represent any circuitry or combination of circuitry and executable instructions to determine an input voltage level of the printing system 100. For instance, the input voltage engine 110 may receive a detected input voltage from a power supply or other component of the printing system 100. The input voltage engine 110 may also represent any circuitry or combination of circuitry and executable instructions to determine whether the determined input voltage is outside of a predetermined voltage level range. The predetermined voltage level range may be an acceptable range of voltage levels at which the printing system 100 may be properly (and/or safely) operated. The predetermined voltage level range may vary for different printing systems and may be determined through testing and/or may be user-defined.

The input voltage to the printing system 100 may vary for any number of reasons. For instance, the printing system 100 may be connected to a wall outlet to receive power and the voltage level of the power from the wall outlet may vary over time due to, for instance, fluctuations in the power supply from a power source of the wall outlet, power drain caused by other electronics drawing power from the power source, etc.

The printing components engine 112 may represent any circuitry or combination of circuitry and executable instructions to control the printing components 102 to operate in one of a normal mode and a reduced throughput mode based upon whether the accessed input voltage level is outside of the predetermined voltage level range. That is, the input voltage engine 110 may inform the printing components engine 112 that the determined input voltage is outside of the predetermined voltage level range. In response, the printing components engine 112 may control the printing components 102 to operate in the reduced throughput mode instead of the normal mode.

According to various examples, instead of controlling the printing components 102 to operate in the reduced throughput mode immediately in response to receipt of information from the input voltage engine 110 that the input voltage is outside of the predetermined voltage level range, the printing components engine 112 may wait to do so until the printing components engine 112 has received a predetermined number of the indications. These examples are described in greater detail herein below.

Turning now to FIG. 1B, the printing system 120 may include a printing components 102, an input voltage engine 110, and a printing components engine 112, which have been described above with respect to FIG. 1A. The printing system 120 may also include a power supply 122 through which an input voltage 124 may be received into the printing system 120, a counter 126, a dryer 128, and a dryer engine 130. The power supply 122 may receive power supplied into the printing system 120 and may determine the voltage level of the power being received. The power supply 122 may forward that information to the input voltage engine 110.

The counter 126 may be a hardware and/or software device that may be implemented to track the number of times the input voltage has been determined to be outside of the predetermined voltage level range as discussed in greater detail herein.

The dryer 128 may equivalently be termed a fuser, a heating element, or the like, and may be a component of the printing system 100, 120 that dries marking material onto a media. Thus, for instance, the dryer 128 may become heated to apply heat onto media after the media has received marking material or other marking material from the printing components 102.

The dryer engine 130 may represent any circuitry or combination of circuitry and executable instructions to control activation and deactivation of the dryer 128. For instance, the dryer engine 130 may instruct or otherwise control the dryer 128 to become activated to reach a target temperature. The dryer engine 130 may determine whether components of the dryer 128 are functioning properly and/or whether the dryer 128 is functioning as expected, e.g., becoming heated according to a predetermined time frame. The dryer engine 130 may inform the printing components engine 112 when the components of the dryer 128 are not functioning properly and/or are not functioning as expected. In response, the printing components engine 112 may control the printing components 102 to operate in the reduced throughput mode. Various manners in which printing components 102 may be operated in the reduced throughput mode in response to the dryer 128 operations are discussed in greater detail herein.

Figure 2:
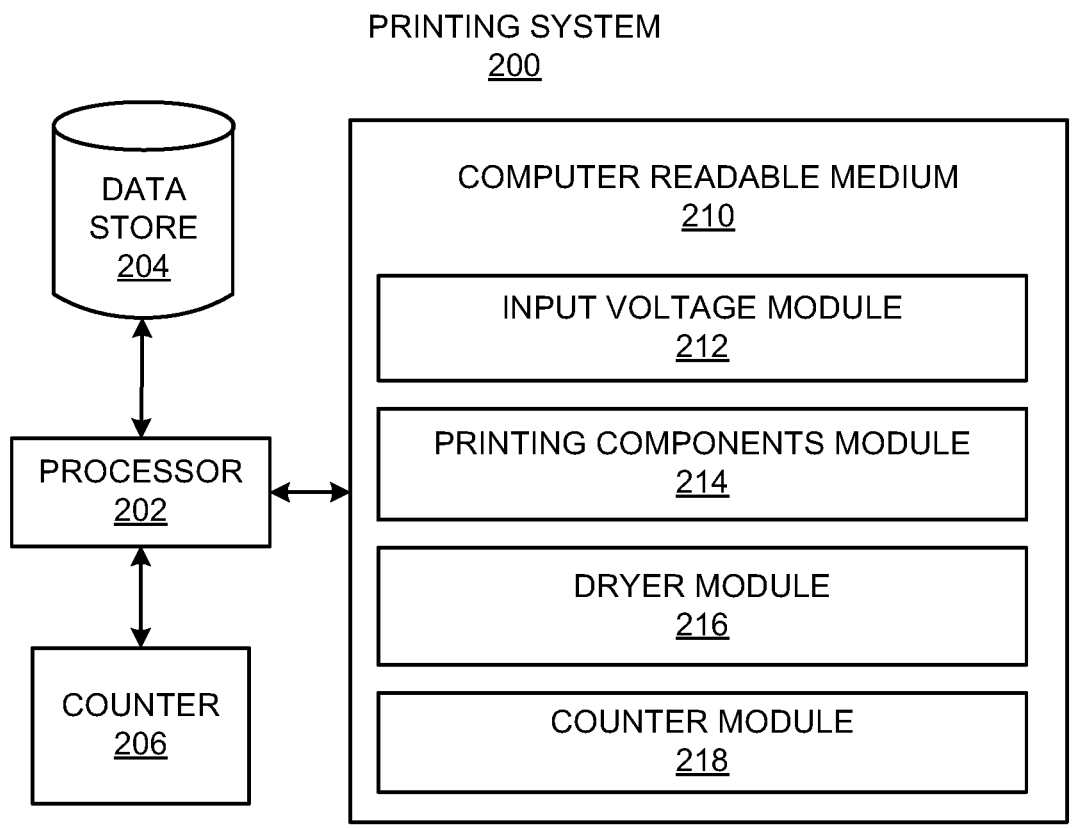
FIG. 2 depicts a block diagram of another example printing system.

Turning now to FIG. 2, there is shown a block diagram of another example printing system 200. The example printing system 200 may include a processor 202 and a computer readable medium 210, in which the computer readable medium 210 is operatively coupled to the processor 202. The computer readable medium 210 may contain a set of instructions that are executable by the processor 202. The printing system 200 may also include a data store 204 on which the processor 202 may store various information, such as print data, predetermined voltage level ranges, counter limits, expected dryer functions, etc. The printing system 200 may further include a counter 206, which may be equivalent to the counter 126 shown in FIG. 1B.

The set of instructions may cause the processor 202 to perform operations of the printing system 200 when the processor 202 executes the set of instructions. The set of instructions stored on the computer readable medium 210 may be represented as an input voltage module 212, a printing components module 214, a dryer module 216, and a counter module 218. The modules 212-218 may represent machine readable instructions and/or firmware. In addition, the modules 212-216 may represent machine readable instructions that when executed function as the input voltage engine 110, the printing components engine 112, and the dryer engine 130 depicted in FIG. 1B, respectively. The counter module 218 may increment a count responsive to various conditions occurring with respect to the printing system 200 as discussed herein.

The processor 202 may carry out a set of instructions to execute the modules 212-218, and/or any other appropriate operations among and/or associated with the modules of the printing system 200. Although modules 212-218 are illustrated and discussed in relation to FIG. 2 and other example implementations, other combinations or sub-combinations of modules may be included within other implementations. Stated differently, although the modules illustrated in FIG. 2 and discussed in other example implementations may perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules.

The processor 202 may be any appropriate circuitry that is to process (e.g., computing) instructions, such as one or multiple processing elements that may retrieve instructions from the computer readable medium 210 and executing those instructions. For example, the processor 202 may be a central processing unit (CPU) that enables operational adjustment by fetching, decoding, and executing the modules 212-218. Example processors 202 may include at least one CPU, a semiconductor-based microprocessor, a programmable logic device (PLD), and the like. Example PLDs may include an application specific integrated circuit (ASIC), a field-programmable gate array (FPGA), a programmable array logic (PAL), a complex programmable logic device (CPLD), and an erasable programmable logic device (EPLD). The processor 202 may include multiple processing elements that are integrated in a single device or distributed across devices. The processor 202 may process the instructions serially, concurrently, or in partial concurrence.

The computer readable medium 210 may represent a medium to store data utilized and/or produced by the printing system 200. The computer readable medium 210 may be any non-transitory medium or combination of non-transitory mediums able to electronically store data, such as the modules 212-218 and/or data used by the printing system 200. For example, the computer readable medium may be distinct from a transitory transmission medium, such as a signal. As used herein, a non-transitory computer readable medium may refer to any storage medium with the exclusion of a signal. The computer readable medium may be an electronic, magnetic, optical, or other physical storage device that may contain (i.e., store) executable instructions. The computer readable medium 210 may store program instructions that when executed by the processor 202 cause the processor 202 to implement functionality of the printing system 200. The computer readable medium 210 may be integrated in the same device as the processor 202 or may be separate but accessible to that device and the processor 202. The computer readable medium 210 may also be distributed across devices.

In the discussions above, the engines 110, 112, and 130 shown in FIGS. 1A and 1B have been described as circuitry or a combination of circuitry and executable instructions. Such components may be implemented in a number of fashions. With reference to FIG. 2, the executable instructions (modules 212-218) may be processor-executable instructions, such as program instructions, stored on the computer readable medium 210, which may be a tangible, non-transitory computer-readable storage medium, and the circuitry may be electronic circuitry, such as processor 202, for executing those instructions. The instructions residing on the computer readable medium 210 may include any set of instructions to be executed directly (such as machine code) or indirectly (such as a script) by the processor 202.

In some examples, the printing system 200 may include the executable instructions or may be part of an installation package that when installed may be executed by the processor 202 to perform operations of the printing system 200, such as the methods described with regard to FIGS. 3 and 4 below. In that example, the computer readable medium 210 may be a portable medium such as a compact disc, a digital video disc, a flash drive, or memory maintained by a computer device, such as a server, from which the installation package may be downloaded and installed. In another example, the executable instructions may be part of an application or applications already installed. The computer readable medium 210 may be a non-volatile memory resource such as read only memory (ROM), a volatile memory resource such as random access memory (RAM), a storage device, or a combination thereof. Example forms of a computer readable medium 210 may include static RAM (SRAM), dynamic RAM (DRAM), electrically erasable programmable ROM (EEPROM), flash memory, or the like. The computer readable medium 210 may include integrated memory such as a hard drive (HD), a solid state drive (SSD), or an optical drive.

Figure 3:
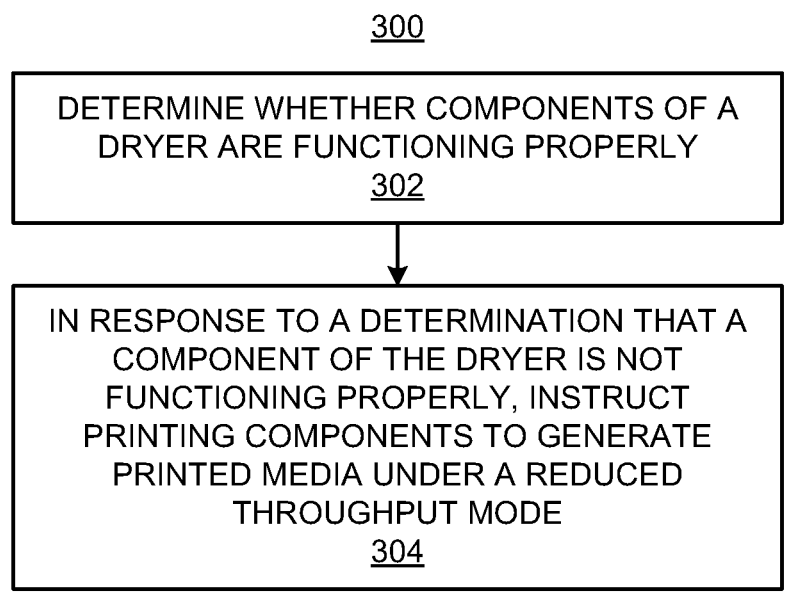
FIGS. 3 and 4, respectively, show flow diagrams of example methods for operating a printing system.
Figure 4:
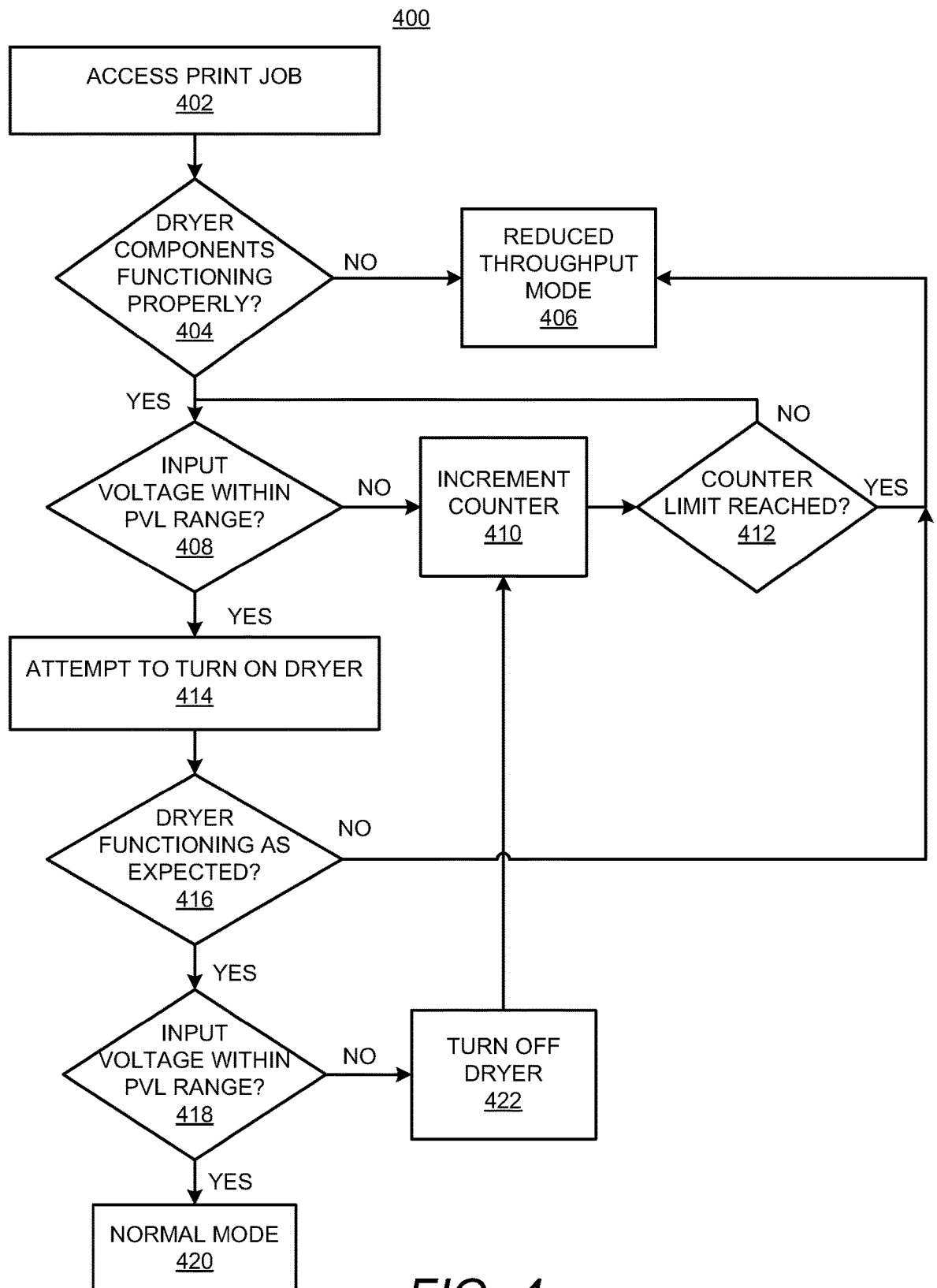

Various manners in which the engines 110, 112, 130 and the processor 202 may be implemented are discussed in greater detail with respect to the methods 300 and 400 respectively depicted in FIGS. 3 and 4. Particularly, FIGS. 3 and 4, respectively, depict flow diagrams of example methods 300 and 400 for operating a printing system. It should be apparent to those of ordinary skill in the art that the methods 300 and 400 may represent generalized illustrations and that other operations may be added or existing operations may be removed, modified, or rearranged without departing from the scopes of the methods 300 and 400. Generally speaking, the engines 110, 112, 130 depicted in FIGS. 1A and 1B and/or the processor 202 (including the modules 212-218) depicted in FIG. 2 may implement various features of either or both of the methods 300 and 400.

The descriptions of the methods 300 and 400 are made with reference to the printing systems 100, 120, and 200 illustrated in FIGS. 1A, 1B, and 2 for purposes of illustration. It should, however, be clearly understood that printing systems having other configurations may be implemented to perform either or both of the methods 300 and 400 without departing from the scopes of the methods 300 and 400.

With reference first to the method 300 depicted in FIG. 3, at block 302, a determination may be made as to whether components of a dryer 128 of a printing system 200 are functioning properly. The components of the dryer 128 may include an MPCA thermistor circuit, a thermal fuse, cabling for a thermistor, dryer connectors, an alternating current control mode (ACCM), etc. For instance, a determination may be made as to whether any one or more of: a reading from a dryer temperature sensor is being received, a reading from an ambient temperature sensor is being received, communication with a triode for alternating current (TRIAC) controller is available (e.g., a signal in a bit stream from the TRIAC controller has been missed), an AC voltage is present, the dryer is heating up according to a predetermined ramp rate, power is being directed to the dryer correctly, the dryer fan is spinning at the correct speed (e.g., revolutions per minute (RPM)), or the like. A determination may be made that a component of the dryer is not functioning properly if any of the above-cited features is negative. As particular examples, a determination may be made that a component of the dryer is not functioning properly if there is a blown thermal fuse, if there is a broken heating element wire, if there is no AC power to the ACCM, if there is no control signal to the ACCM, if there is a defective relay in the ACCM, if there is a bad connector to the dryer 128, or the like.

At block 304, in response to a determination that a component of the dryer 128 is not functioning properly, printing components 102 of the printing system 120 may be instructed to generate printed media under a reduced throughput mode. As discussed above, the reduced throughput mode may be a mode in which the printing system generates printed media at a relatively slower rate as compared with a normal mode in which the printing system generates printed media at a nominal rate. The slower rate may be achieved through slower printing of marking material onto sheets of media and/or through providing gaps between sheets of printed media.

Through implementation of the method 300, a printing system 100, 120, 200 may continue to operate, albeit in a reduced throughput mode, even in instances where components of the printer dryer 128 are not functioning properly. According to an example, however, in response to a determination that the fan of the dryer is not spinning at the correct speed, printing operations by the printing system 100, 120, 200 may be stopped instead of being operated at the reduced throughput mode.

Turning now to FIG. 4, at block 402, a print job may be accessed. Access of a print job may cause a printing system 100, 120, 200 to initiate a printing operation of print data corresponding to the print job. Initiation of the printing operation may include an attempt to heat up a dryer 128.

At block 404, a determination may be made as to whether components of the dryer 128 are functioning properly. Block 404 may be equivalent to block 302 in FIG. 3.

In response to a determination that a component of the dryer 128 is not functioning properly, the printing system 100, 120, 200 may be operated under a reduced throughput mode as indicated at block 406. For instance, in response to a determination that any of an MPCA voltage comparator has malfunctioned, a cable has failed, a thermal fuse has broken, etc., the printing components 102 of the printing system 100, 120, 200 may be operated to generate printed media under a reduced throughput mode.

In response to a determination at block 404 that the dryer components are functioning properly, a determination may be made as to whether an input voltage level of the printing system 100, 120, 200 is within a predetermined voltage level (PVL) range as indicated at block 408. The predetermined voltage level range may be an acceptable range of voltage levels at which the printing system 100, 120, 200 may be properly (and/or safely) operated. The predetermined voltage level range may vary for different printing systems and may be determined through testing and/or may be user-defined.

In response to a determination at block 408 that the input voltage 124 level is outside of the predetermined voltage level range, a counter 126, 206 may be incremented as indicated at block 410. In addition, at block 412, a determination may be made as to whether a counter limit has been reached. The counter limit may be user-defined and maybe any value of about between 100 and 3,000. The counter limit may also be tracked over a period of time, such as over one week, over two weeks, etc., after which time the counter limit may be reset. In response to a determination that the counter limit has not been reached at block 412, block 408 may be repeated. In addition, blocks 408-412 may be repeated until a determination is made that the input voltage range is within the predetermined voltage level range at block 408 or that the counter limit has been reached at block 412. According to an example, blocks 408-412 may be repeated until the counter limit is reached to account for fluctuations in the input voltage as may occur due to intermittent draw by other electronic equipment of power from commonly shared power lines.

In response to a determination that the counter limit has been reached at block 412, the printing components 102 of the printing system 100, 120, 200 may be operated at the reduced throughput mode as indicated at block 406. In response to a determination at block 408 that the input voltage is within the predetermined voltage level range, an attempt may be made to turn on the dryer 128 as indicated at block 414. In addition, at block 416, a determination may be made as to whether the dryer 128 is functioning as expected. By way of example, the dryer 128 may be determined as functioning as expected if the temperature of the dryer 128 is ramping up according to a predetermined schedule. In response to a determination at block 416 that the dryer 128 is not functioning as expected, the printing components 102 of the printing system 100, 120, 200 may be operated at the reduced throughput mode as indicated at block 406.

However, in response to a determination at block 416 that the dryer 128 is functioning as expected, a determination may be made as to whether the input voltage 124 level is within a predetermined voltage level range at block 418. The predetermined voltage level range used at block 418 may be the same range used to determine voltage level range used at block 408. In other examples, however, the predetermined voltage level range used at block 418 may be a different range from the predetermined voltage level range used at block 408. For instance, the predetermined voltage level range used at block 418 may be a relatively narrower range or larger range than the predetermined voltage level range used at block 408. By way of example, the predetermined voltage level range used at block 408 may be between about 80 volts and about 150 volts and the predetermined voltage level range used at block 418 may be between about 75 volts and about 150 volts on a 1XX nominal voltage circuit.

In response to a determination at block 418 that the input voltage 124 level is within the predetermined voltage level range, the printing components 102 may be operated under the normal mode as indicated at block 420. However, in response to a determination at block 418 that the input voltage 124 range is outside of the predetermined voltage level range, the dryer 128 may be turned off as indicated at block 422. At block 422, instead of turning off the dryer 128, e.g., a fan and a heating element, the heating element may be turned off while the fan remains running. In addition, blocks 410 and 412 may be implemented. As shown in FIG. 4, the same counter 126, 206 may be incremented following block 422 such that the determination as to whether the counter limit has been reached may be cumulative following both blocks 408 and 422. In other examples, however, a different counter (not shown) may be incremented following block 422 and a different counter limit may be determined. In those examples, following a determination that the counter limit has been reached, the printing components 102 may be operated under the reduced throughput mode at block 406 and following a determination that the counter limit has not been reached, the method 400 may continue at block 408.

Through implementation of the method 400, a failure in or with respect to a dryer 128 may not result in a shutdown of a printing system 100, 120, 200. Instead, for many component failure scenarios, the printing system 100, 120, 200 may continue to print media at reduced throughput levels, e.g., at reduced speeds.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable medium. Examples of non-transitory computer readable media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A printing system comprising:
  an input voltage engine to determine whether an input voltage level is outside of a predetermined voltage level range;
  a printing components engine to control printing components to operate in one of a normal mode and a reduced throughput mode based upon whether the input voltage level is outside of the predetermined voltage level range;
  a dryer having components; and
  a dryer engine to determine whether the components of the dryer are functioning properly, wherein, in response to a determination that the input voltage level is within the predetermined voltage level range, the dryer engine is to:
    attempt to activate the dryer;
    determine whether the dryer is functioning as expected; and
  wherein, in response to a determination that the dryer is not functioning as expected, the printing components engine is to control the printing components to operate in the reduced throughput mode.

2. The printing system according to claim 1, wherein to determine whether the input voltage level is outside of the predetermined voltage level range, the input voltage engine is further to determine whether the input voltage level is outside of the predetermined voltage level range over a predefined number of counts and, in response to the input voltage level being outside of the predetermined voltage level range over the predefined number of counts, the printing components engine is to control the printing components to operate in the reduced throughput mode.

3. The printing system according to claim 1, wherein the reduced throughput mode comprises a mode in which the printing components print at a rate slower than the normal mode and/or insert a pause between printing of sheets of media.

4. The printing system according to claim 1, wherein the printing components engine is further to:
  access a print job identifying data to be printed on a page;
  determine a print density of the data to be printed on the page; and
  in response to a determination that the printing components are to be operated in the reduced throughput mode, control the printing components to print at a first reduced level in response to the determined print density falling below a predetermined print density level and to print at a second reduced level in response to the determined print density exceeding the predetermined print density level.

5. The printing system according to claim 1, wherein the input voltage engine is further to determine whether the input voltage level is outside of the predetermined voltage level range in response to a determination that the components of the dryer are functioning properly.

6. The printing system according to claim 1, wherein the input voltage engine is further to:
  in response to a determination that the dryer is functioning as expected, determine whether an instant input voltage level is outside of a second predetermined voltage level range;
  wherein, in response to a determination that the instant input voltage level is outside of the second predetermined voltage level range, the dryer engine is to deactivate the dryer and determine whether a counter has reached a predefined count; and
  wherein, in response to a determination that the counter has reached the predefined count, the printing components engine is to control the printing components to operate in the reduced throughput mode.

7. The printing system according to claim 6, wherein the input voltage engine is further to:
  in response to a determination that the counter has not reached the predefined count, determine whether a current input voltage level is outside of the predetermined voltage level range;
  wherein, in response to a determination that the current input voltage level is within the predetermined voltage level range, the dryer engine is to:
    attempt to activate the dryer;
    determine whether the dryer is functioning as expected; and
  wherein, in response to a determination that the dryer is not functioning as expected, the printing components engine is to control the printing components to operate in the reduced throughput mode.

8. The printing system according to claim 1, wherein to determine whether the dryer is functioning as expected, the dryer engine is further to determine whether the dryer is becoming heated according to a predetermined time frame.

9. A method comprising:
  determining, by a processor, whether components of a dryer of a printing system are functioning properly;
  in response to a determination that the components of the dryer are functioning properly, determining, by the processor, whether an input voltage level is outside of a predetermined voltage level range; and
  in response to a determination that the input voltage level is within the predetermined voltage level range,
    attempting, by the processor, to activate the dryer;
    determining, by the processor, whether the dryer is becoming heated at a predetermined rate; and
    in response to a determination that the dryer is not becoming heated at the predetermined rate, instructing, by the processor, printing components of the printing system to generate printed media under a reduced throughput mode.

10. The method according to claim 9, further comprising:
in response to a determination that the input voltage level is outside of the predetermined voltage level range, instructing the printing components of the printing system to generate printed media under the reduced throughput mode.

11. The method according to claim 9, wherein determining whether the input voltage level is outside of the predetermined voltage level range further comprises determining whether the input voltage level is outside of the predetermined voltage level range over a predefined number of counts and, in response to the input voltage level being outside of the predetermined voltage level range over the predefined number of counts, instructing the printing components to generate printed media under the reduced throughput mode.

12. The method according to claim 9, further comprising:
in response to a determination that the dryer is becoming heated at the predetermined rate, determining whether an instant input voltage level is outside of a second predetermined voltage level range;
in response to a determination that the instant input voltage level is outside of the second predetermine voltage level range, deactivating the dryer and determining whether a counter has reached a predefined count; and
in response to a determination that the counter has reached the predefined count, instructing the printing components to generate printed media under the reduced throughput mode.

13. The method according to claim 9, further comprising:
in response to a determination that a component of the dryer is not functioning properly, instructing, by the processor, the printing components of the printing system to generate printed media under the reduced throughput mode.

14. A non-transitory computer readable medium on which is stored machine readable instructions that when executed are to cause a processor to:
determine whether each of a plurality of input voltage levels measured over a predefined period of time is outside of a predetermined voltage level range;
in response to a determination that each of the plurality of input voltage levels is within the predetermined voltage level range, attempt to activate a dryer of a printer;
determine whether the dryer is becoming heated at a predetermined rate; and
in response to a determination that the dryer is not becoming heated at the predetermined rate, instruct printing components of the printer to generate printed media under a reduced throughput mode.

15. The non-transitory computer readable medium according to claim 14, wherein the machine readable instructions are further to cause the processor to:
in response to a determination that each of the plurality of input voltage levels is outside of the predetermined voltage level range,
instruct the printing components to generate printed media under the reduced throughput mode.

\* \* \* \* \*